(12) United States Patent
Weng et al.

(10) Patent No.: US 12,724,126 B2
(45) Date of Patent: Sep. 1, 2026

(54) OPTICAL SYSTEM

(71) Applicant: Actutek Corporation, Taoyuan City (TW)

(72) Inventors: Chih-Wei Weng, Taoyuan City (TW); Chao-Chang Hu, Taoyuan City (TW); Yung-Hsien Yeh, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 823 days.

(21) Appl. No.: 18/156,104

(22) Filed: Jan. 18, 2023

(65) Prior Publication Data

US 2023/0236294 A1 Jul. 27, 2023

Related U.S. Application Data

(60) Provisional application No. 63/312,987, filed on Feb. 23, 2022, provisional application No. 63/301,836, filed on Jan. 21, 2022.

(51) Int. Cl.
*G01S 7/481* (2006.01)
*G02B 1/00* (2006.01)
*G02B 26/10* (2006.01)

(52) U.S. Cl.
CPC ............ *G01S 7/4817* (2013.01); *G02B 1/002* (2013.01); *G02B 26/105* (2013.01)

(58) Field of Classification Search
CPC .... G02B 1/002; G02B 26/101; G02B 26/105; G01S 7/4817
See application file for complete search history.

(56) References Cited

U.S. PATENT DOCUMENTS

2005/0190426 A1* 9/2005 Urakawa .............. G02B 27/017 359/224.1
2017/0153527 A1* 6/2017 Kim .................. G02F 1/133602
2022/0373686 A1* 11/2022 Megerdichian ....... G01S 7/4817

FOREIGN PATENT DOCUMENTS

EP 3667361 A1 * 6/2020 ........... G02B 26/105
WO WO-2008052365 A1 * 5/2008 ........... G02B 26/105
WO WO-2022101349 A1 * 5/2022 ........... G01S 7/4817

OTHER PUBLICATIONS

Shaltout, Amir et al. "Spatiotemporal light control with active metasurfaces". Science, vol. 364, No. 6441, May 17, 2019. (Year: 2019).*

* cited by examiner

*Primary Examiner* — Michael A Lyons
(74) *Attorney, Agent, or Firm* — MUNCY, GEISSLER, OLDS & LOWE, P.C.

(57) ABSTRACT

An optical system configured to perform scans is provided. The optical system includes a carrier portion and an emitting portion. The carrier portion is configured to connect an optical member. The emitting portion is configured to emit a light, wherein the light is emitted toward a sensing object via the optical member.

24 Claims, 25 Drawing Sheets

X
Z
Y
200
220
210
300
L
420
410
400
220
100
T

OPTICAL SYSTEM

CROSS REFERENCE TO RELATED APPLICATIONS

The present application claims priority to U.S. Provisional Patent Application No. 63/301,836, filed on Jan. 21, 2022, and U.S. Provisional Patent Application No. 63/312,987, filed on Feb. 23, 2022, which are incorporated by reference herein in their entirety.

BACKGROUND OF THE INVENTION

Field of the Invention

The application relates in general to an optical system, and in particular, to an optical system configured to perform scans.

Description of the Related Art

Thanks to technological advancements, unmanned vehicle technology has matured in recent years. In general, there are five types of unmanned vehicles: unmanned ground vehicles (UGV), unmanned aerial vehicles (UAV), unmanned surface vehicles (USV), unmanned underwater vehicles (UUV), and unmanned spacecraft.

Autonomous cars are an example of unmanned ground vehicles. However, recent systems used in scanning usually include complex components, and the scanning accuracy has room for improvement. Therefore, how to address the aforementioned problem has become an important issue.

BRIEF SUMMARY OF INVENTION

To address the deficiencies of conventional products, an embodiment of the invention provides an optical system, including a carrier portion and an emitting portion. The carrier portion is configured to connect an optical member. The emitting portion is configured to emit a light, wherein the light is emitted toward a sensing object via the optical member.

In some embodiments, the optical member includes metamaterials.

In some embodiments, the optical member includes a plurality of optical regions, and the light undergoes phase changes due to the optical regions.

In some embodiments, the optical regions have the same area.

In some embodiments, each of the optical regions has a longitudinal structure that is extended along a first direction, and the optical regions are arranged along a second direction, wherein the first direction is perpendicular to the second direction.

In some embodiments, the optical regions are arranged in a matrix.

In some embodiments, the optical system further includes an intermediary region disposed between the optical regions, and the color of the intermediary region is deeper than the color of the optical regions.

In some embodiments, the optical member includes a plurality of first microstructures and a plurality of second microstructures, the first microstructures are disposed in one of the optical regions, and the second microstructures are disposed in another of the optical regions, wherein the dimensions of each of the first microstructures are different from the dimensions of each of the second microstructures.

In some embodiments, the optical member includes a plurality of first microstructures and a plurality of second microstructures, the first microstructures are disposed in one of the optical regions, and the second microstructures are disposed in another of the optical regions, wherein the size of the gap between the first microstructures is different from the size of the gap between the second microstructures.

In some embodiments, the optical member includes a substrate and a plurality of microstructures, the microstructures are formed on a surface of the substrate, and each of the microstructures has a circular structure, an oval structure, a polygonal structure, or an irregularly shaped structure.

In some embodiments, the substrate includes quartz or glass.

In some embodiments, the optical member is disposed between the emitting portion and the sensing object, and the optical member includes a transparent material or a translucent material, wherein the light passes through the optical member and reaches the sensing object.

In some embodiments, the optical member includes an opaque material, and the light is reflected by the optical member and then reaches the sensing object.

In some embodiments, the carrier portion includes a base and at least one suspension line, the suspension line is connected to the base and the optical member, wherein the optical system further includes a first driving assembly, and the driving assembly is configured to drive the optical member to move relative to the base.

In some embodiments, the optical system further includes a second driving assembly, the first driving assembly is enabled to drive the optical member to rotate around a first rotation axis, the second driving assembly is enabled to drive the carrier to rotate around a second rotation axis, and the first rotation axis is substantially perpendicular to the second rotation axis.

In some embodiments, the optical system further includes a reflecting member, and the light passes through the optical member and then is reflected to the sensing object by the reflecting member.

In some embodiments, the optical system further includes a driving assembly connected to the emitting portion, and the driving assembly is configured to drive the emitting portion to rotate relative to the optical member.

In some embodiments, the optical system further includes a reflecting member and a driving assembly, the emitting portion emits the light to the reflecting member, and the driving assembly drives the reflecting member to rotate relative to the optical member.

In some embodiments, the emitting portion includes a multiple point light source, and the optical system further includes a driving assembly configured to drive the carrier portion to move relative to the sensing object.

In some embodiments, the emitting portion is disposed on the carrier portion, and the optical member is disposed between the emitting portion and the sensing object, wherein the emitting portion and the optical member are fixed relative to each other.

In some embodiments, the optical member is disposed between the emitting portion and the sensing object, and the driving assembly is enabled to drive the carrier and the optical member to move relative to the emitting portion.

In some embodiments, the optical system further includes a reflecting member, and the optical member is disposed between the emitting portion and the reflecting member, wherein the light passes through the optical member and then is reflected by the reflecting member, and the reflected light passes through the optical member again and reaches the sensing object.

In some embodiments, the reflecting member is disposed on the carrier portion, and the reflecting member and the optical member are fixed relative to each other.

In some embodiments, the driving assembly is enabled to drive the carrier and the optical member to move relative to the emitting portion.

In some embodiments, when the driving assembly drives the carrier portion and the optical member to move to a first angle, the light irradiates a first region of the sensing object, and when the driving assembly drives the carrier portion and the optical member to move to a second angle that is different from the first angle, the light irradiates a second region of the sensing object, wherein the first region and the second region overlap.

In some embodiments, the optical system further includes a receiver, configured to receive the light reflected by the sensing object.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In some embodiments, the terms “about” and “substantially” can indicate a value of a given quantity that varies within 5% of the value (e.g., ±1%, ±2%, ±3%, ±4%, ±5% of the value). These values are merely examples and are not intended to be limiting. The terms “about” and “substantially” can refer to a percentage of the values as interpreted by those skilled in relevant art(s) in light of the teachings herein.

Figure 1:
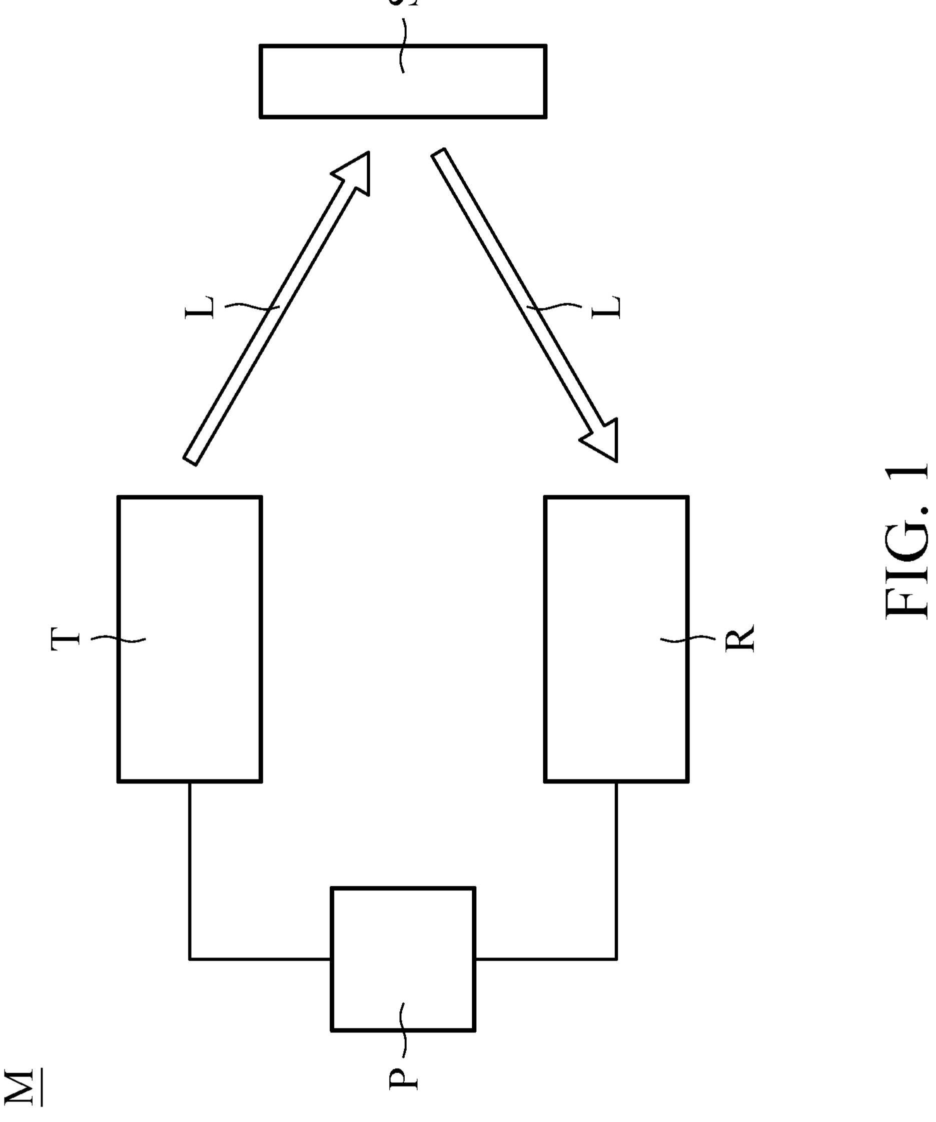
FIG. 1 is a schematic diagram of an optical system according to an embodiment of the invention.

Referring to FIG. 1, an optical system M in an embodiment of the invention is configured to scan a sensing object S, and includes an emitter T, a receiver R, and a controller P. The emitter T and the receiver R are electrically connected to the controller P. The emitter T can emit a light L to the sensing object S. When the light L is in contact with the sensing object S, the light L is reflected by the sensing object S, and the receiver R can receive the reflected light L. After the receiver R receives the light L, the receiver R can transmit the obtained data to the controller P, and the controller P can build a model or control other components (such as the motor or the steering wheel of the vehicle) using the analysis of the obtained data.

Figure 2:
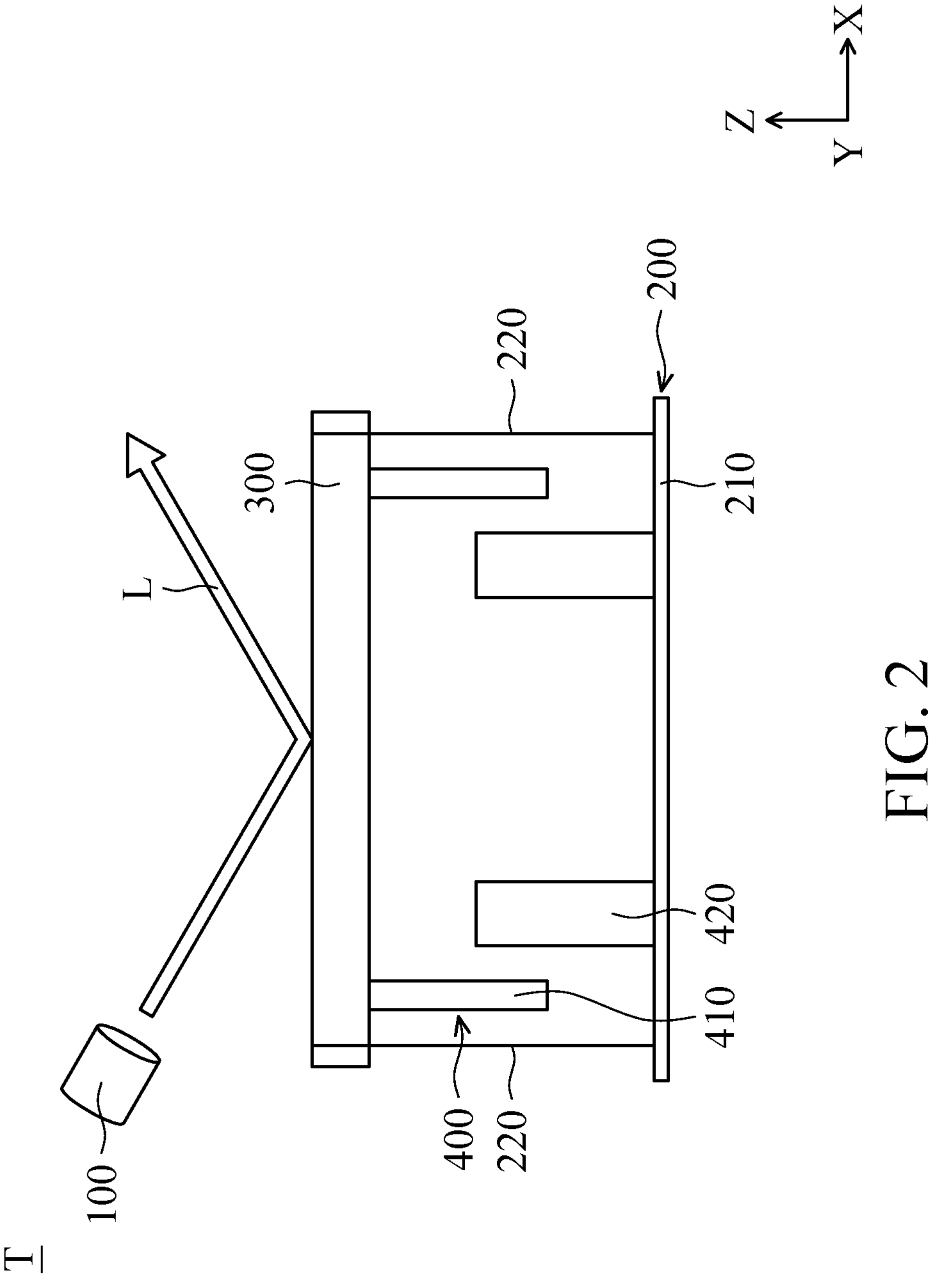
FIG. 2 is a schematic diagram of an emitter according to an embodiment of the invention.

FIG. 2 is a schematic diagram of an emitter T according to an embodiment of the invention. As shown in FIG. 2, the emitter T primarily includes an emitting portion 100, a carrier portion 200, an optical member 300, and a first driving assembly 400.

The emitting portion 100 includes a single point light source, such as a laser diode light source, but it is not limited thereto. The carrier portion 200 includes a base 210 and at least one suspension line 220. The suspension line 220 is flexible and is connected to the base 210 and the optical member 300. Therefore, the optical member 300 is movable relative to the base 210.

Figure 3A:
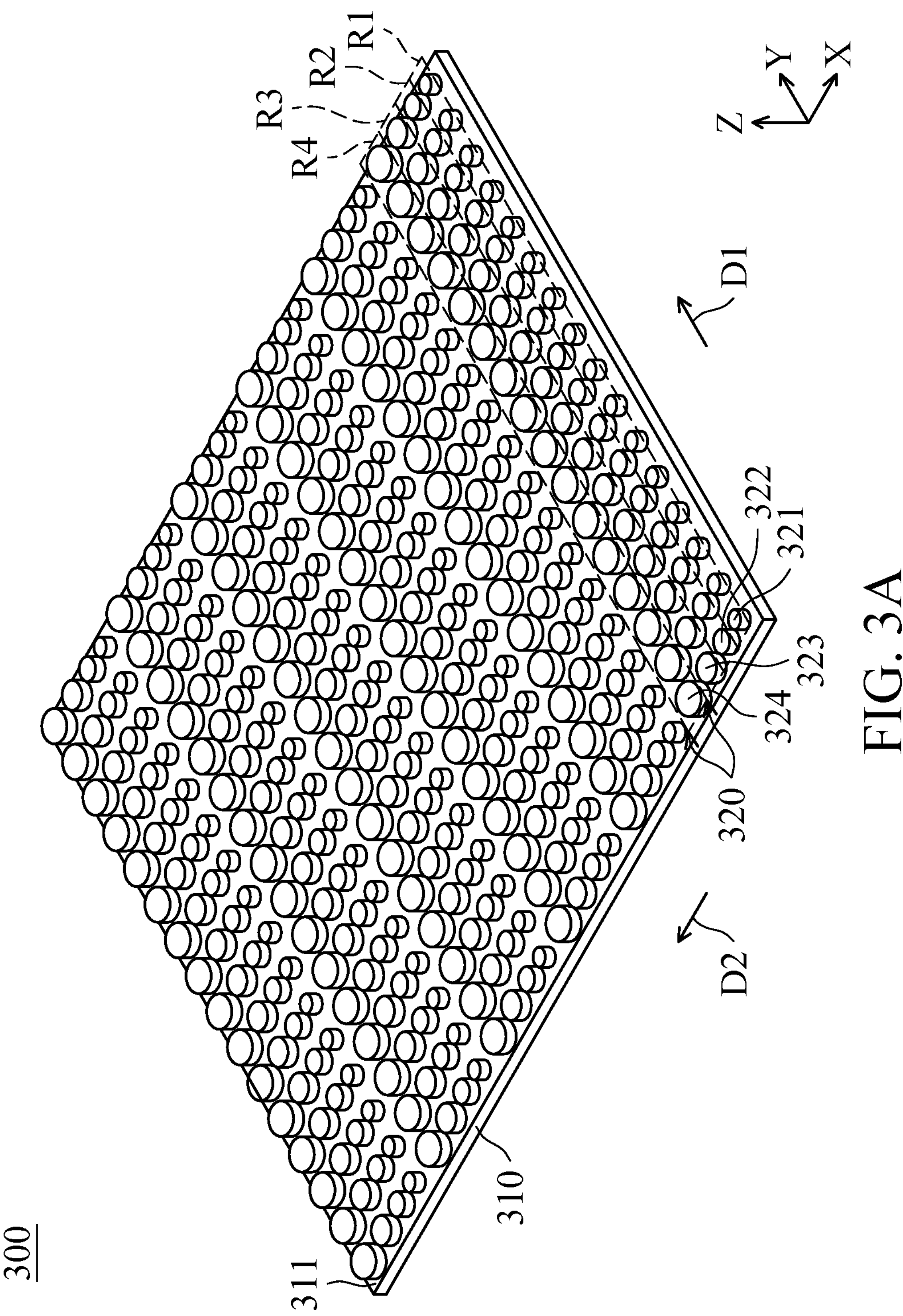
FIG. 3A is a schematic diagram of an optical member according to an embodiment of the invention.
Figure 3B:
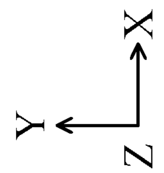
FIG. 3B is a partial top view of the optical member according to an embodiment of the invention.
Figure 3B:
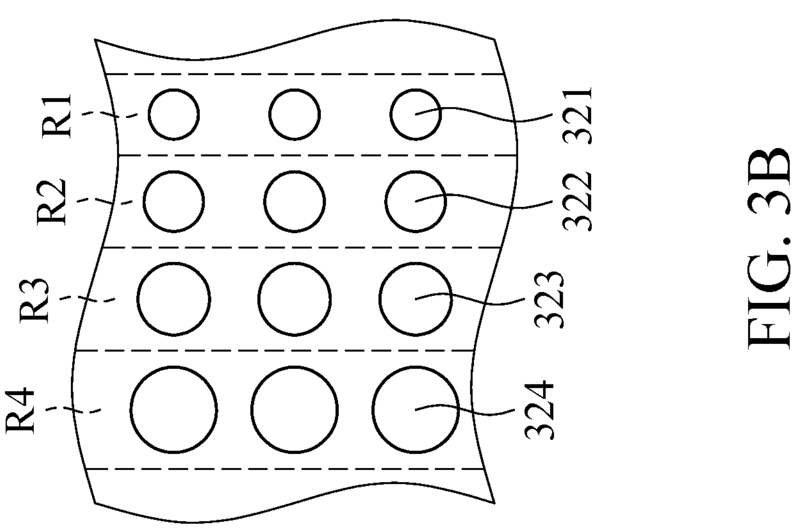
Figure 4A:
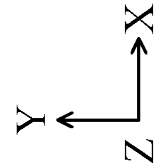
FIG. 4A is a partial top view of an optical member according to another embodiment of the invention.
Figure 4A:
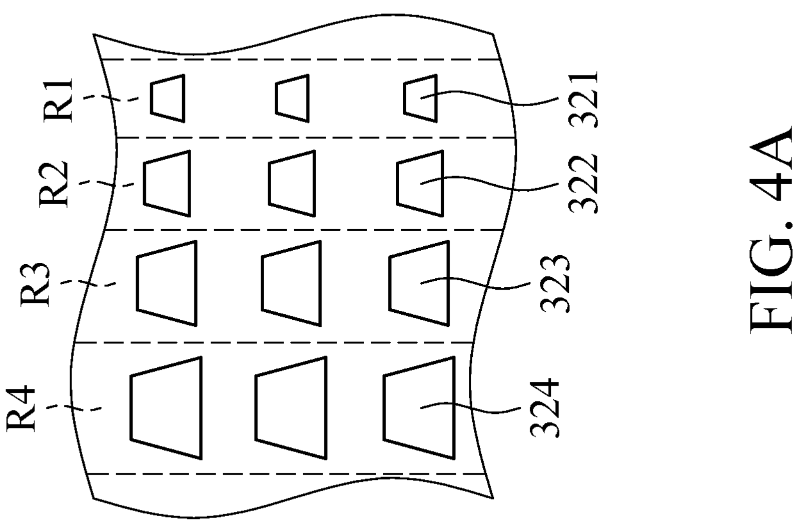
Figure 4B:
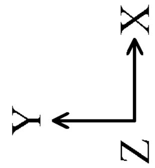
FIG. 4B is a partial top view of an optical member according to another embodiment of the invention.
Figure 4B:
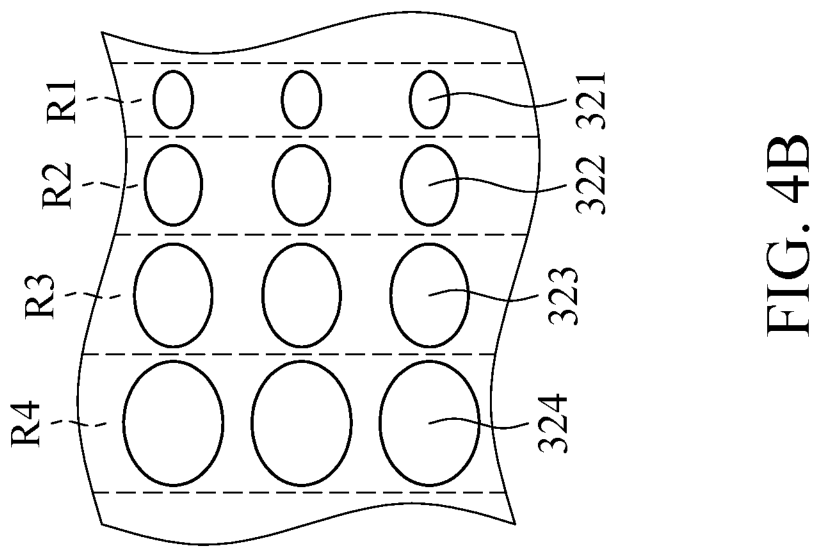
Figure 4C:
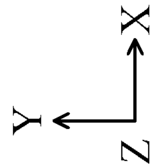
FIG. 4C is a partial top view of an optical member according to another embodiment of the invention.
Figure 4C:
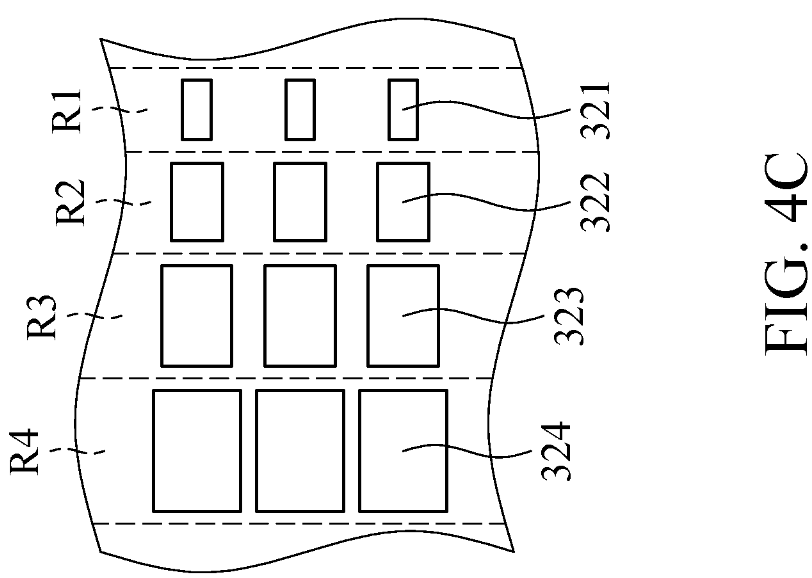
Figure 4D:
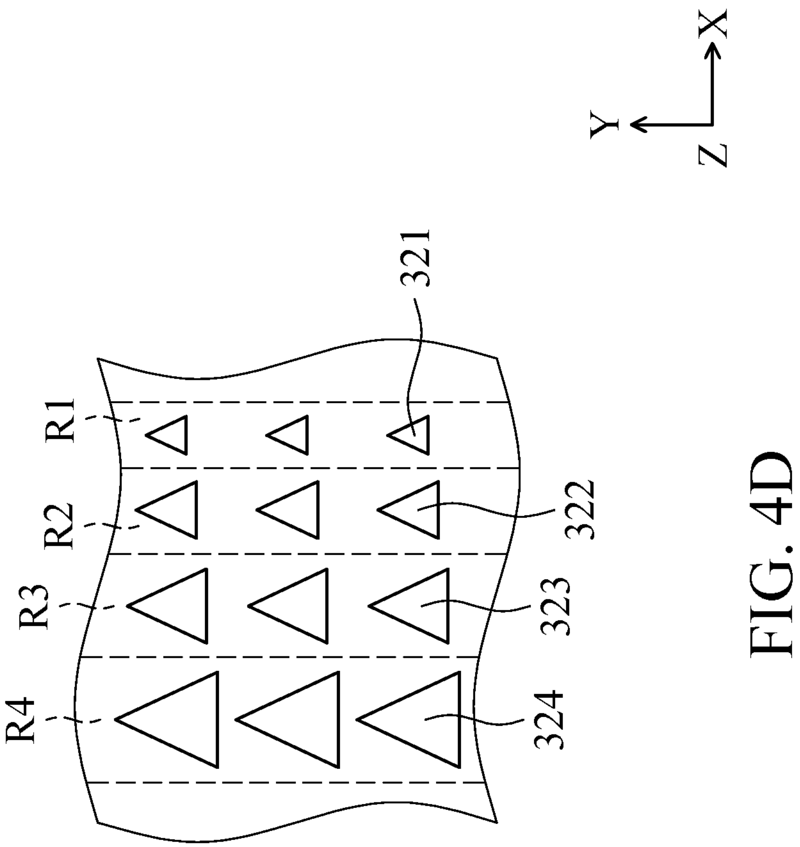
FIG. 4D is a partial top view of an optical member according to another embodiment of the invention.
Figure 4E:
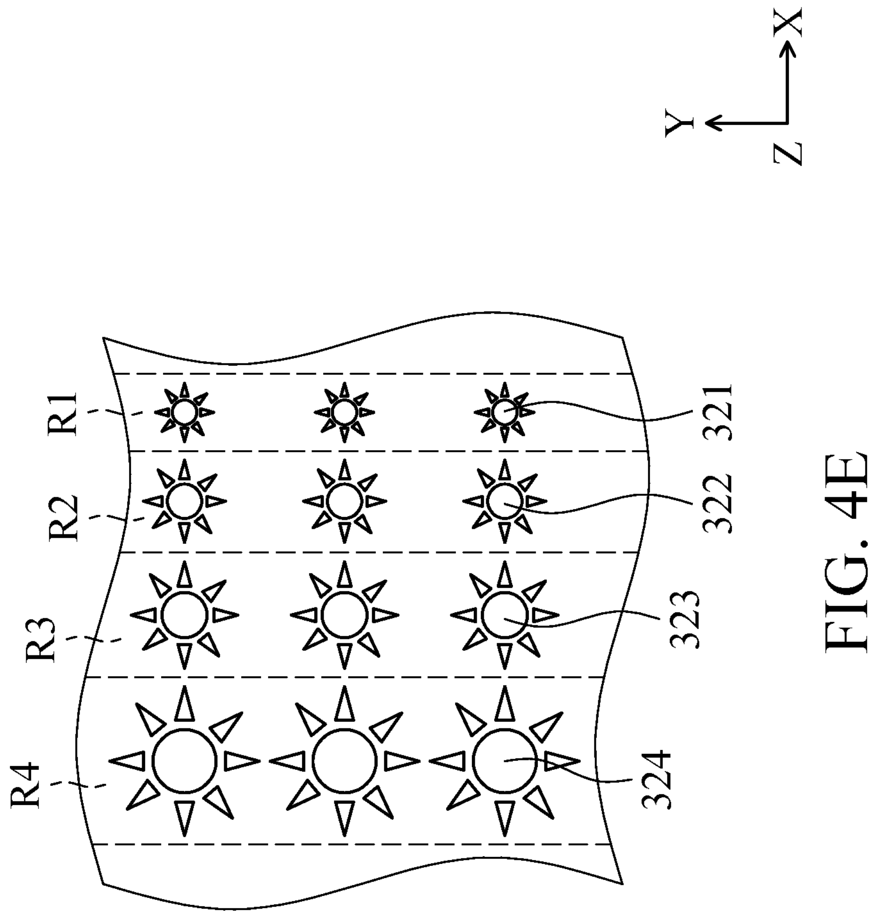
FIG. 4E is a partial top view of an optical member according to another embodiment of the invention.

Referring to FIG. 2, FIG. 3A, and FIG. 3B, in this embodiment, the optical member 300 includes metamaterials. In particular, the optical member 300 includes a substrate 310 and a plurality of microstructures 320. The microstructures 320 are formed on a surface 311 of the substrate 310 and protrude from the surface 311.

The substrate 310 can be made, for example, by quartz or glass, and the surface 311 of the substrate 310 can be divided into a plurality of optical regions R1, R2, R3, and R4. The microstructures 320 in the optical regions R1, R2, R3, and R4 can include different dimensions (the length, the width, and/or the height). Thus, different phases can be generated when the light L from the emitting portion 100 is in contact with the optical regions R1, R2, R3, and R4, and the light L can include different optical characteristic (for example, with different energy and different reflected angles).

In this embodiment, each of the optical regions R1, R2, R3, and R4 includes a longitudinal structure that is extended along a first direction D1, and the optical regions R1, R2, R3, and R4 are arranged along a second direction D2 that is perpendicular to the first direction D1. The areas of the optical regions R1, R2, R3, and R4 are the same. The dimensions of the microstructures 320 in the optical area R1 (the first microstructures 321) is less than the dimensions of the microstructures 320 in the optical area R2 (the second microstructure 322), the dimensions of the microstructures 320 in the optical area R2 (the second microstructures 322) is less than the dimensions of the microstructures 320 in the optical area R3 (the third microstructure 323), and the dimensions of the microstructures 320 in the optical area R3 (the third microstructures 323) is less than the dimensions of the microstructures 320 in the optical area R4 (the fourth microstructure 324). Therefore, the optical areas R1, R2, R3, and R4 can respectively create the phases in 0, $\pi/2$, $\pi$, and $3\pi/2$, but it is not limited thereto.

In this embodiment, each of the microstructures 320 has a circular structure, but it is not limited thereto. For example, as shown in FIGS. 4A-4E, in some embodiments, each of the microstructures 320 can have an oval structure, a polygonal structure (including a triangular structure, a rectangular structure, a trapezoidal structure, or etc.), or an irregularly shaped structure.

Figure 5:
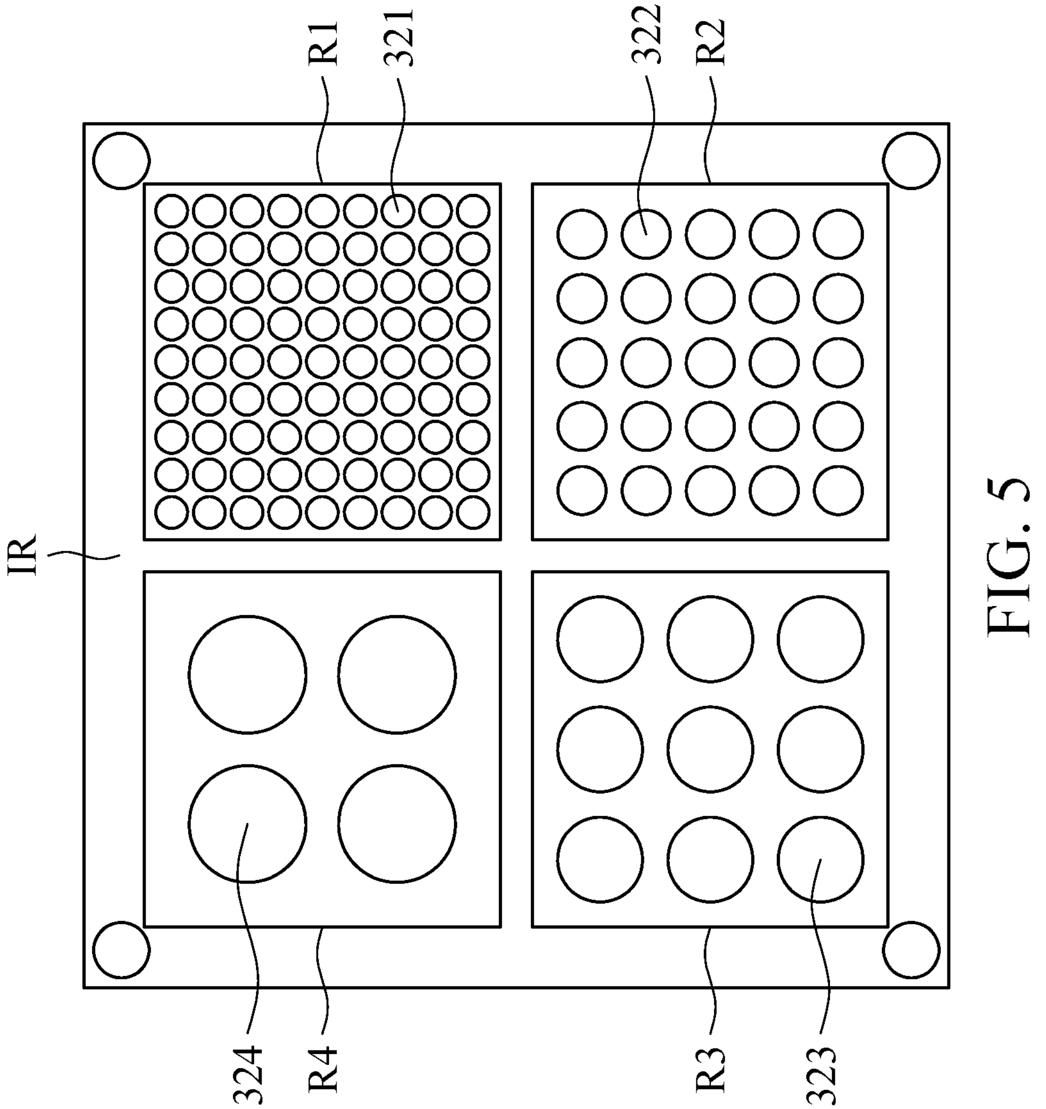
FIG. 5 is a schematic diagram of an optical member according to another embodiment of the invention.

Referring to FIG. 5, in some embodiments, the areas of the optical regions R1, R2, R3, and R4 are the same, and the optical regions R1, R2, R3, and R4 are arranged in a matrix and are separate from each other. In other words, there is an intermediary region IR disposed between the optical regions R1, R2, R3, and R4. The dimensions of each of the first microstructures 321 in the optical region R1 are smallest, and the size of the gap between the first microstructures 321 is smallest. The dimensions of each of the second microstructure 322 in the optical region R2 is larger than the dimensions of each of the first microstructure 321 in the optical region R1, and the size of the gap between the second microstructures 322 is larger than the size of the gap between the first microstructures 321. The dimensions of each of the third microstructure 323 in the optical region R3 is larger than the dimensions of each of the second microstructure 322 in the optical region R2, and the size of the gap between the third microstructures 323 is larger than the size of the gap between the second microstructures 322. The dimensions of each of the fourth microstructures 324 in the optical region R4 are largest, and the size of the gap between the fourth microstructures 324 is largest. In other words, the density of the microstructure 320 in the optical region R1 is larger than the density of the microstructure 320 in the optical region R2, the density of the microstructure 320 in the optical region R2 is larger than the density of the microstructure 320 in the optical region R3, and the density of the microstructure 320 in the optical region R3 is larger than the density of the microstructure 320 in the optical region R4.

Figure 6:
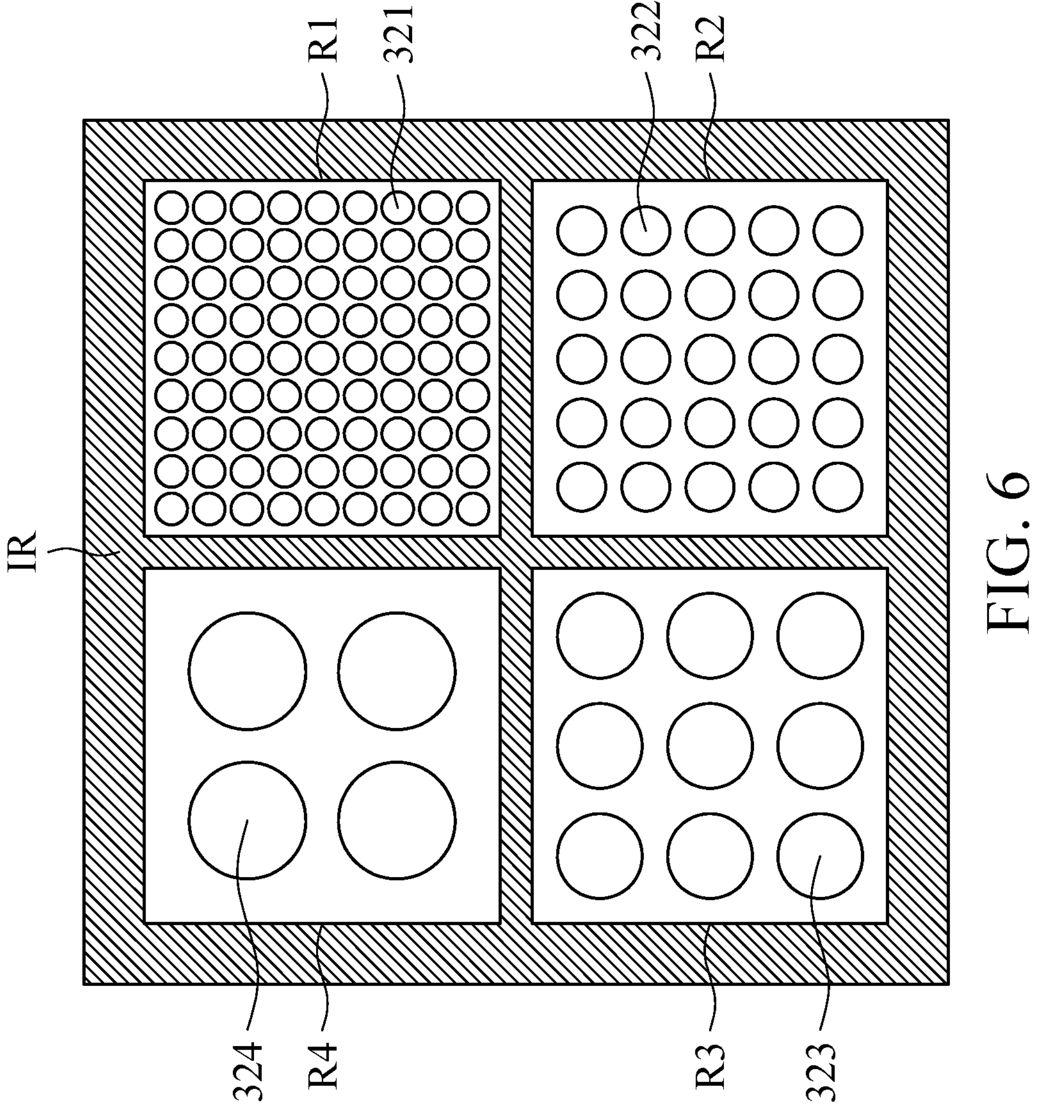
FIG. 6 is a schematic diagram of an optical member according to another embodiment of the invention.

Referring to FIG. 6, in some embodiment, the color of the intermediary region IR is deeper than the color of the optical regions R1, R2, R3, and R4, so that the absorbance of the intermediary region IR is larger than the absorbance of the optical regions R1, R2, R3, and R4. Therefore, it can prevent the light L from being reflected by the intermediary region IR, and the reduction of the measurement accuracy of the optical system M can be avoided. For example, the ink can be coated on the intermediary region IR to let the color of the intermediary region IR being deeper than the color of the optical regions R1, R2, R3, and R4. The color of the intermediary region IR can be black, but it is not limited thereto.

Referring to FIG. 2, the first driving assembly 400 is configured to drive the optical member 300 to move (shift or rotate). For example, the first driving assembly 400 can include at least one first electromagnetic driving member 410 and at least one second electromagnetic driving member 420. The first electromagnetic driving member 410 and the second electromagnetic driving member 420 are corresponded to each other and respectively connected to the optical member 300 and the base 210. Of the first electromagnetic driving member 410 and the second electromagnetic driving member 420, one may serve as a driving coil, and the other may serve as a magnetic member (such as a magnet). Therefore, when current flows through the driving coil, an electromagnetic effect is generated between the driving coil and the magnetic member, and the optical member 300 can be driven to shift or rotate relative to the base 210. In some embodiments, the first driving assembly 400 may include a piezoelectric member connected to the optical member 300 and the base 210. When current flows through the piezoelectric member, the piezoelectric member becomes deformed, and the optical member 300 can be driven to shift or rotate relative to the base 210.

Figure 7A:
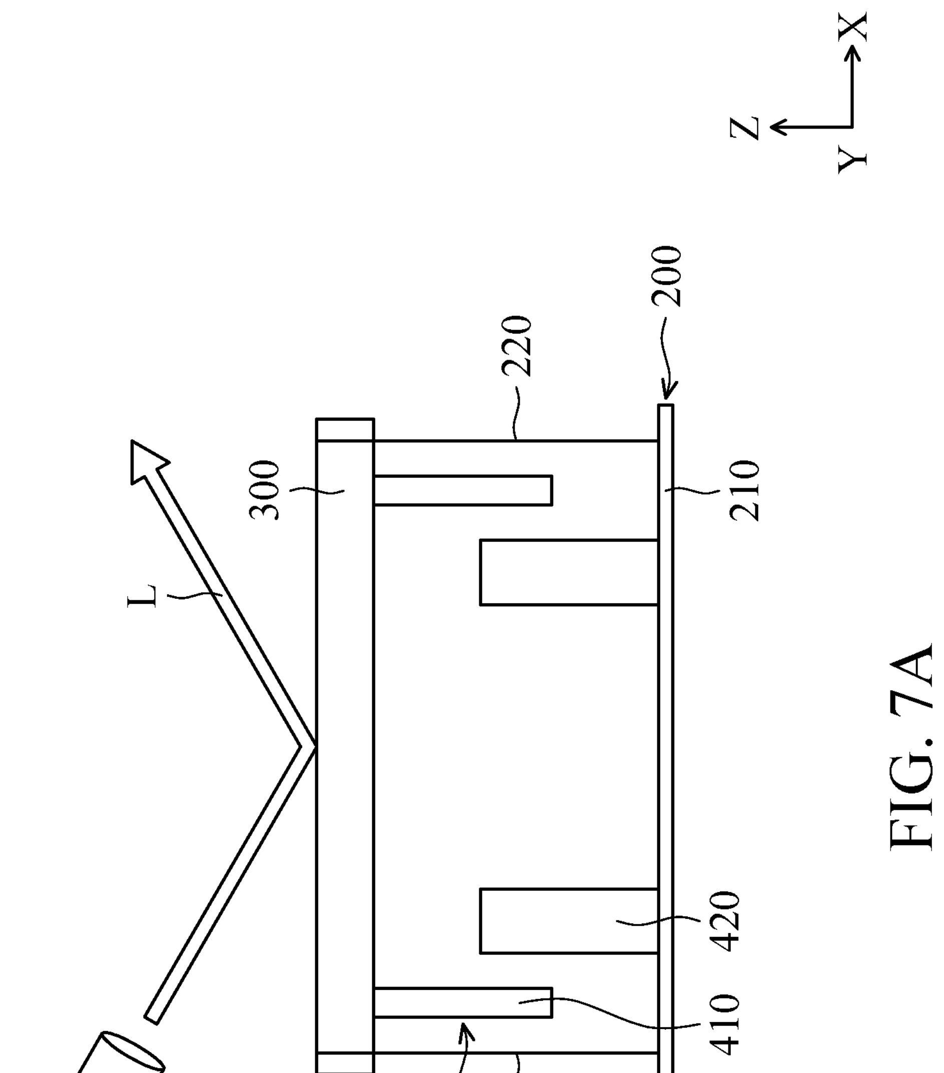
FIG. 7A is a schematic diagram of the emitter according to an embodiment of the invention.
Figure 7B:
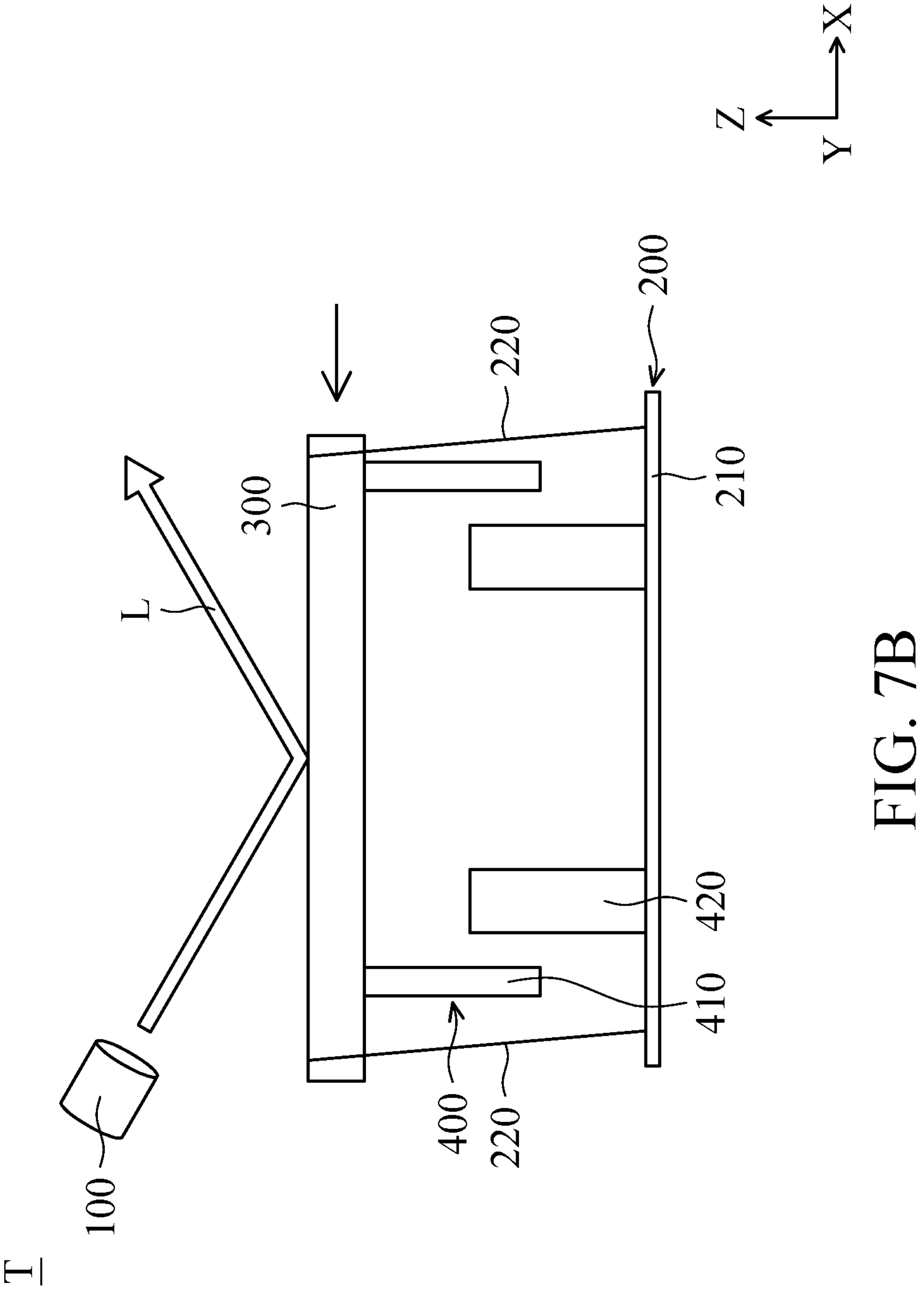
FIG. 7B is a schematic diagram representing that a first driving assembly drives the optical member to shift according to an embodiment of the invention.

When the light L from the emitting portion 100 irradiates one optical region of the optical member 300, the light L can reach a predetermined distance from the optical system M. When the light L from the emitting portion 100 irradiates the aforementioned optical region and the first driving assembly 400 drives the optical member 300 to rotate, the optical system M can scan the state (such as the surface undulations or the appearance outline) of the sensing object S at the predetermined distance from the optical system M. Referring to FIG. 7A and FIG. 7B, when the first driving assembly 400 drives the optical member 300 to shift, the light L from the emitting portion 100 can contact the different optical regions of the optical member 300, so that the light L can reach multiple different distances from the optical system M, and the optical system M can scan the states of the sensing object S at the multiple different distances from the optical system M.

Figure 8:
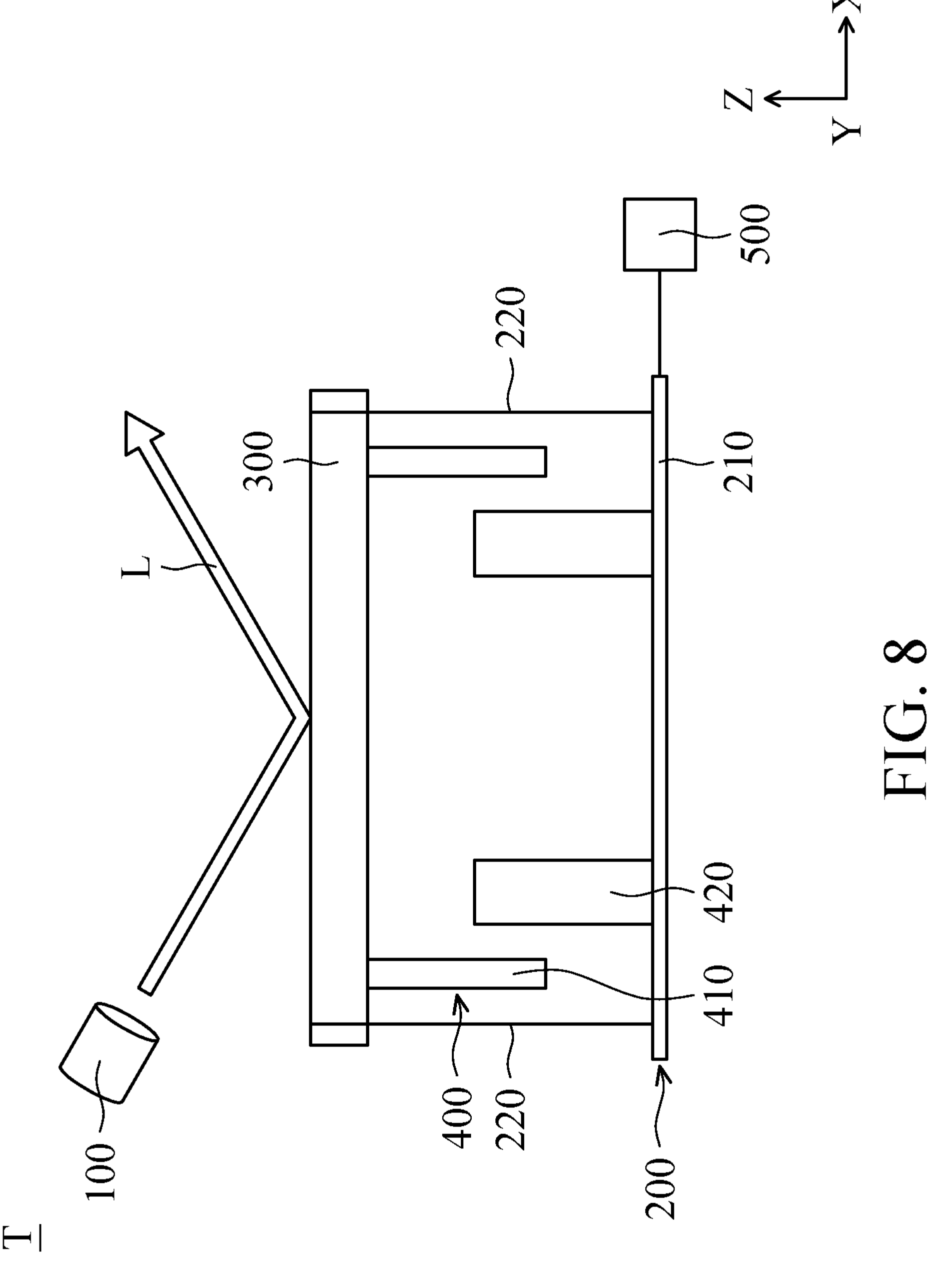
FIG. 8 is a schematic diagram of an emitter according to another embodiment of the invention.

Referring to FIG. 8, in another embodiment of the invention, the optical system M further includes a second driving assembly 500. The second driving assembly 500 is connected to the base 210 of the carrier portion 200, and can drive the carrier portion 200 to rotate. The structure of the second driving assembly 500 can be the same as that of the first driving assembly 400, so that the features thereof are not repeated in the interest of brevity. It should be noted that, the rotation axis (the first rotation axis) around which the first driving assembly 400 drives the optical element 300 to rotate is substantially perpendicular to the rotation axis (the second rotation axis) around which the second driving assembly 500 drives the carrier portion 200 to rotate, so that the optical system M in this embodiment can scan in two dimensions at the every distances from the optical system M. For example, the first driving assembly 400 can drive the optical element 300 to rotate around the X-axis, and the second driving assembly 500 can drive the carrier portion 200 and the optical element 300 to rotate around the Y-axis.

Figure 9:
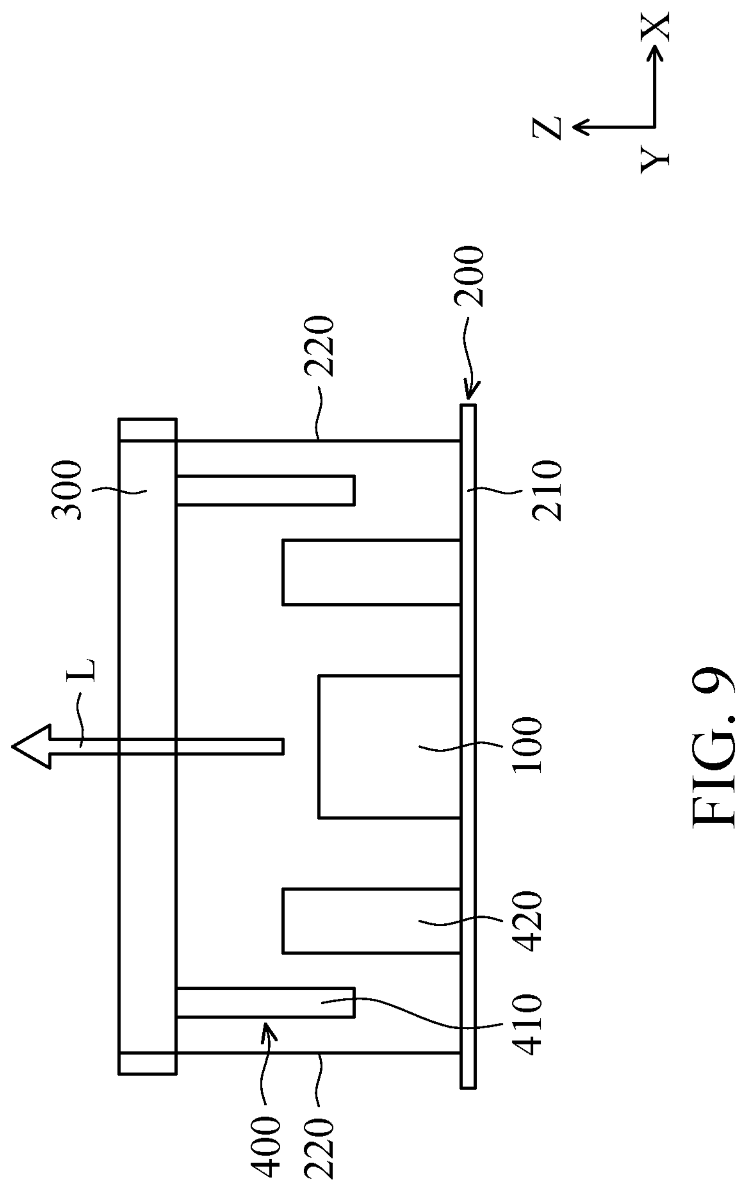
FIG. 9 is a schematic diagram of an emitter according to another embodiment of the invention.
Figure 10:
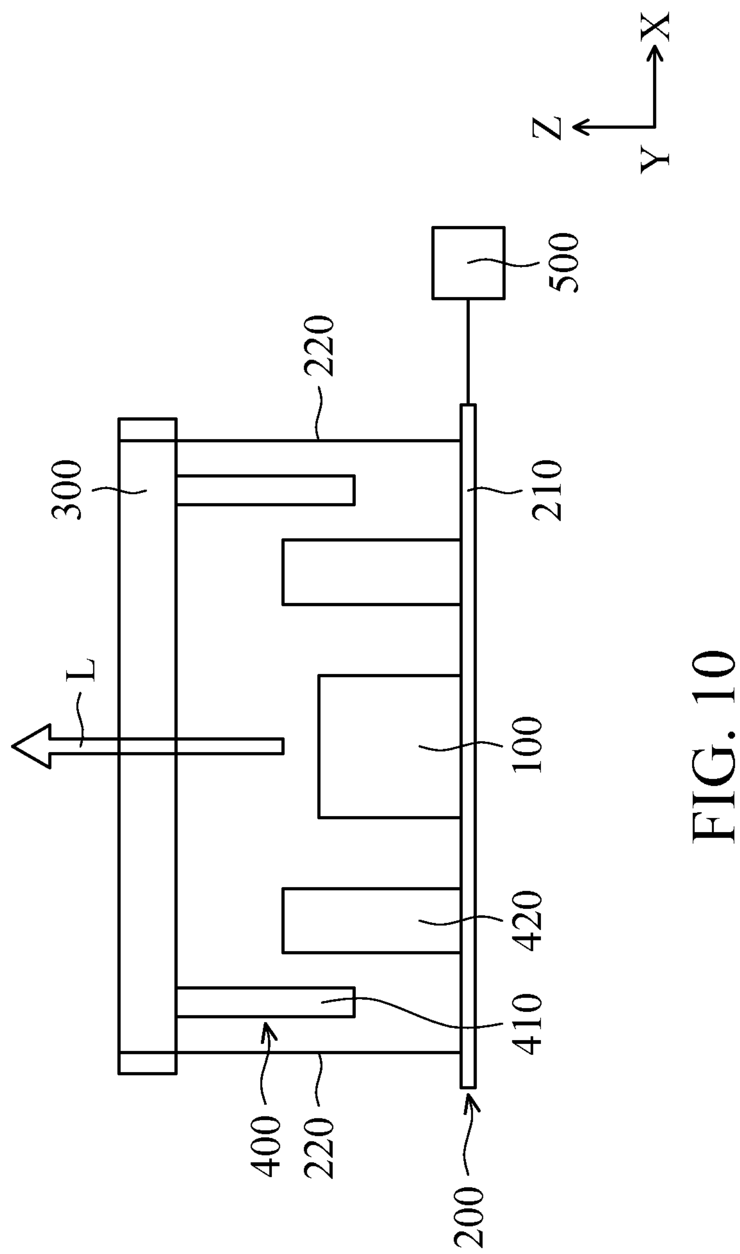
FIG. 10 is a schematic diagram of an emitter according to another embodiment of the invention.

In the aforementioned embodiments, the optical member 300 can include opaque material, so that the emitting portion 100 can emit the light L from the position above the optical member 300. Referring to FIG. 9 and FIG. 10, in some embodiments, the optical member 300 includes transparent material or translucent material, and the emitting portion 100 can be dispose between the optical member 300 and the base 210. Therefore, the light L from the emitting portion 100 can pass through the optical member 300 and then reach the sensing object S. Similarly, after the light L passes through the different optical regions (the optical regions R1, R2, R3, and R4) of the optical member 300, the different phases are created, so that the optical system M can scan the states of the sensing object S at the multiple different distances from the optical system M.

Figure 11:
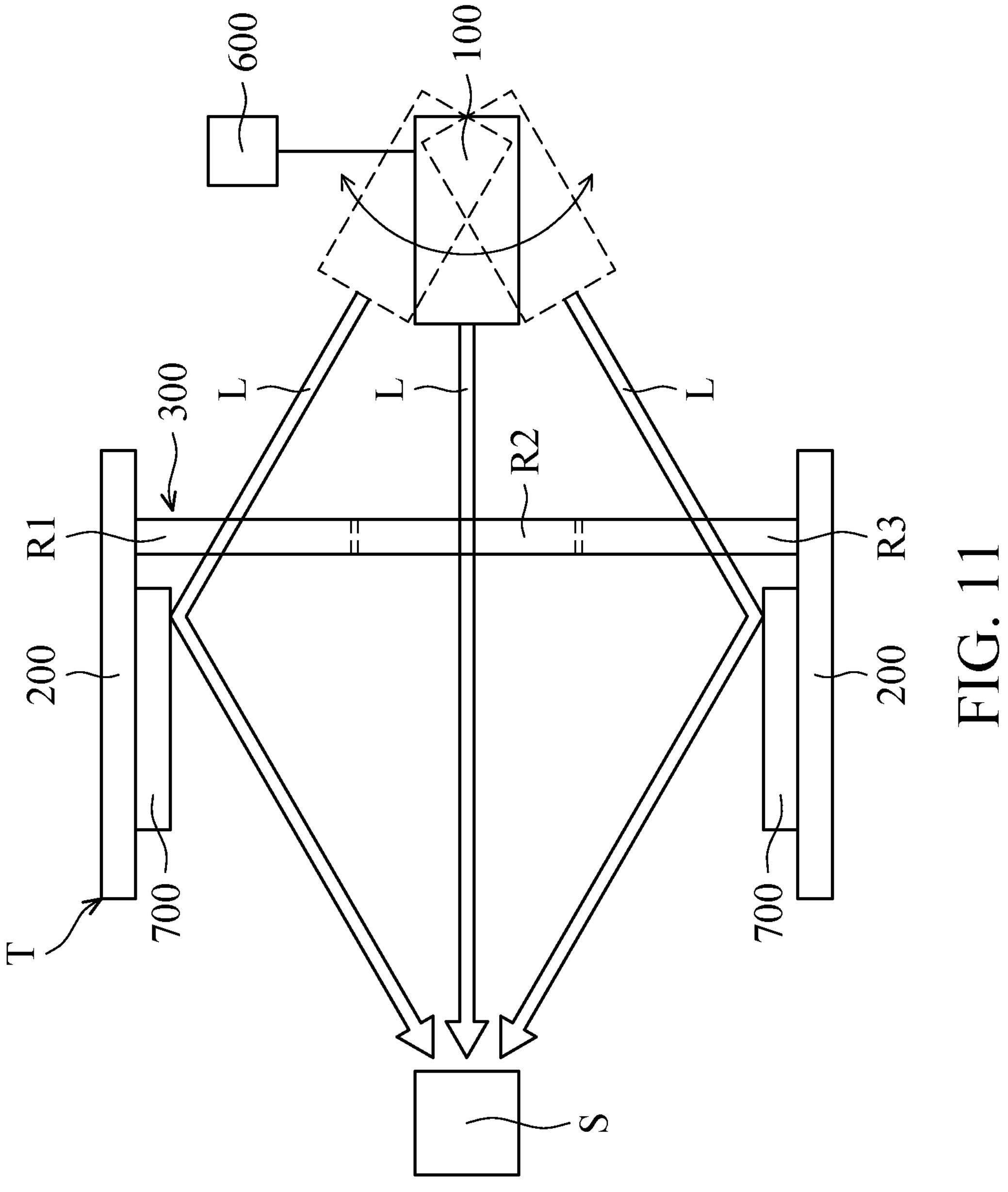
FIG. 11 is a schematic diagram of an emitter according to another embodiment of the invention.

Referring to FIG. 11, in another embodiment of the invention, the emitter T includes an emitting portion 100, a carrier portion 200, an optical member 300, a driving assembly 600, and a plurality of reflecting members 700.

The emitting portion 100 includes a single point light source, such as a laser diode light source, but it is not limited thereto. The optical member 300 includes transparent material or translucent material. The specific structure of the optical member 300 can refer FIG. 2 to FIG. 6 and the descriptions in the aforementioned paragraphs, so that the features thereof are not repeated in the interest of brevity. In FIG. 9, the optical regions R1, R2, and R3 are used as an example of the optical regions of the optical member 300, but it is not limited thereto. The optical member 300 is affixed to the carrier portion 200, and disposed between the emitting portion 100 and the sensing object S. The reflecting members 700 are affixed to the carrier portion 200, and disposed between the optical member 300 and the sensing object S. For example, each of the reflecting members 700 can be a mirror.

The driving assembly 600 is connected to the emitting portion 100, and can drive the emitting portion 100 to rotate. The structure of the driving assembly 600 can be the same as that of the first driving assembly 400 in the aforementioned embodiment, so that the features thereof are not repeated in the interest of brevity. When the driving assembly 600 drives the emitting portion 100 to rotate to a position from which the emitting portion 100 emits the light L toward the optical region R1 or the optical region R3, the light L passes through the optical region R1 or the optical region R3, and then it is reflected by at least one of the reflecting members 700 before it finally reaches the sensing object S. When the driving assembly 600 drives the emitting portion 100 to rotate to a position from which the emitting portion 100 emits the light L toward the optical region R2, the light L passes through the optical region R2 and reaches the sensing object S directly.

Figure 12:
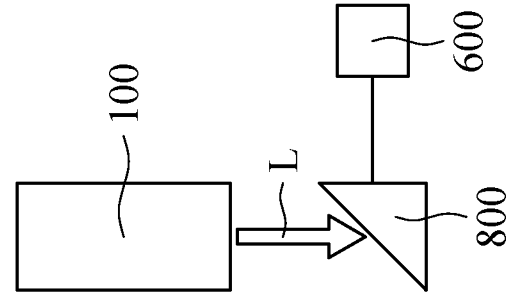
FIG. 12 is a schematic diagram of an emitter according to another embodiment of the invention.
Figure 12:
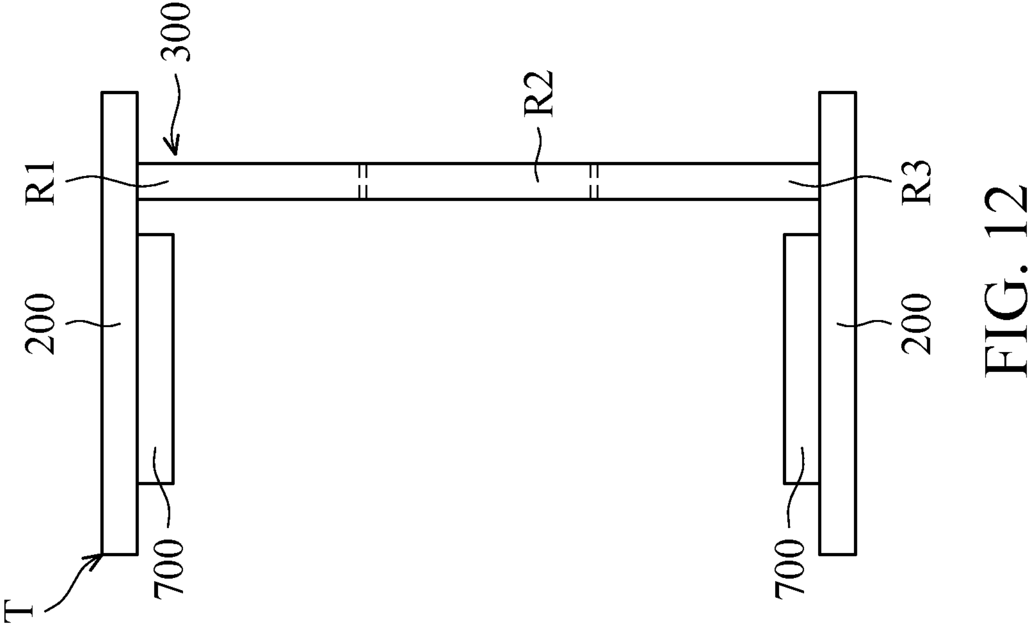
Figure 12:
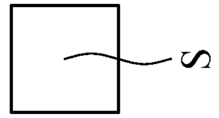

Referring to FIG. 12, in another embodiment of the invention, the emitter T includes an emitting portion 100, a carrier portion 200, an optical member 300, a driving assembly 600, a plurality of reflecting members 700, and a reflecting member 800. The structures and arrangements of the carrier portion 200, the optical member 300, and the reflecting members 700 are the same as those in FIG. 9, so that the features thereof are not repeated in the interest of brevity.

The emitting portion 100 includes a single point light source, and can emit a light L toward the reflecting member 800. The driving assembly 600 is connected to the reflecting member 800, and can drive the reflecting member 800 to rotate. Therefore, when the driving assembly 600 drives the reflecting member 800 to the position from which the light L from the emitting portion 100 is reflected by the reflecting member 800 to the optical region R1 or the optical region R3, the light L passes through the optical region R1 or the optical region R3, and then it is reflected by at least one of the reflecting members 700, before it finally reaches the sensing object S. When the driving assembly 600 drives the reflecting member 800 to the position from which the light L from the emitting portion 100 is reflected by the reflecting member 800 to the optical region R2, the light L passes through the optical region R2 and reaches the sensing object S directly. For example, the reflecting member 800 can be a mirror or a prism.

Figure 13:
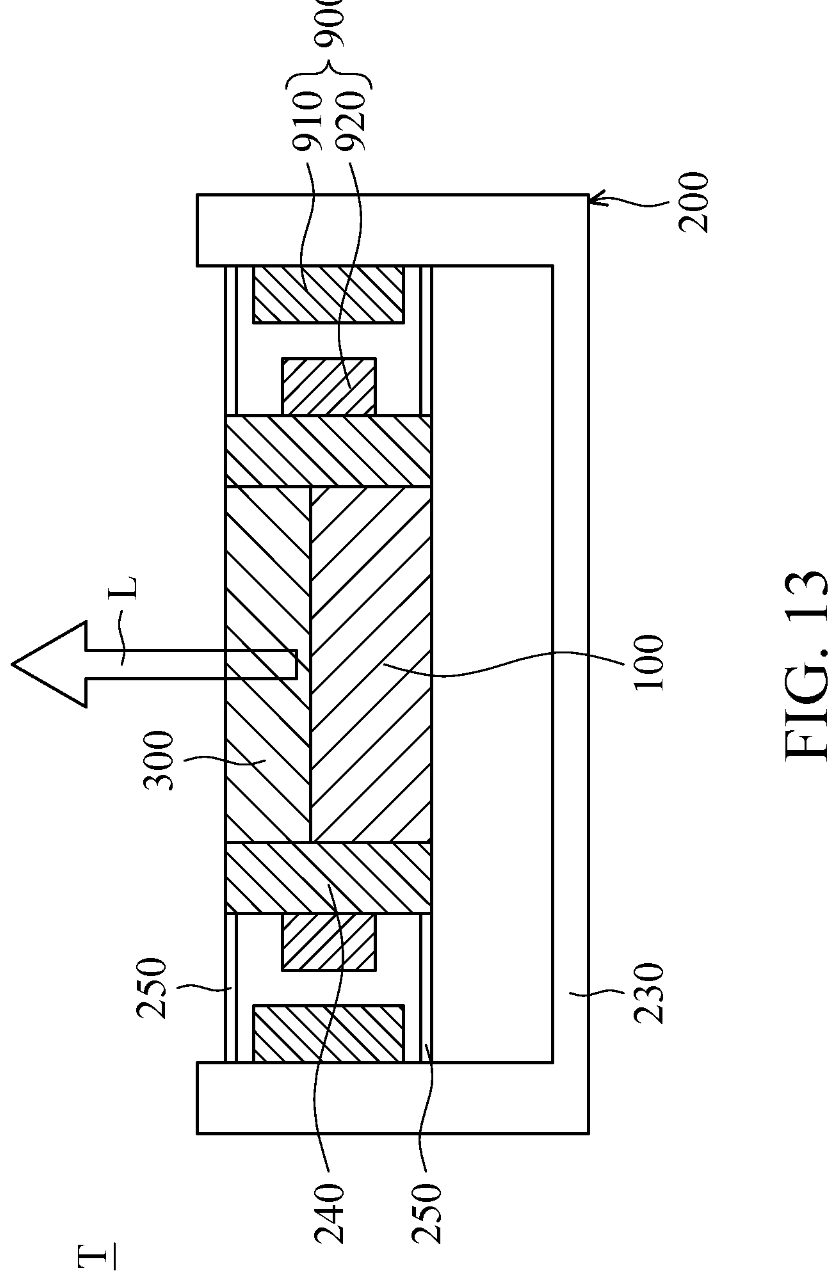
FIG. 13 is a schematic diagram of an emitter according to another embodiment of the invention.

Referring to FIG. 13, in another embodiment of the invention, the emitter T includes an emitting portion 100, a carrier portion 200, an optical member 300, and a driving assembly 900.

The carrier portion 200 includes a fixed member 230, a movable member 240, and a plurality of suspension lines 250. The suspension lines 250 are connected to the fixed member 230 and the movable member 240, so that the movable member 240 is movable relative to the fixed member 230. The driving assembly 900 includes at least one first electromagnetic driving member 910 and at least one second electromagnetic member 920. The first electromagnetic driving member 910 and the second electromagnetic driving member 920 are corresponded to each other and respectively disposed on the fixed member 230 and the movable member 240. Of the first electromagnetic driving member 910 and the second electromagnetic driving member 920, one may serve as a driving coil while the other serves as a magnetic member (such as a magnet). Therefore, when current flows through the driving coil, an electromagnetic effect is generated between the driving coil and the magnetic member, and the movable member 240 can be driven to move (shift or rotate) relative to the fixed member 230.

The optical member 300 is disposed on the movable member 240. The optical member 300 includes transparent or translucent metamaterials. The specific structure of the optical member 300 can refer FIG. 2 to FIG. 6 and the descriptions in the aforementioned paragraphs, so that the features thereof are not repeated in the interest of brevity. The emitting portion 100 is a multiple point light source, and is also disposed on the movable member 240. Therefore, the emitting portion 100 and the optical member 300 are fixed relative to each other, and there is no relative displacement therebetween.

Figure 14:
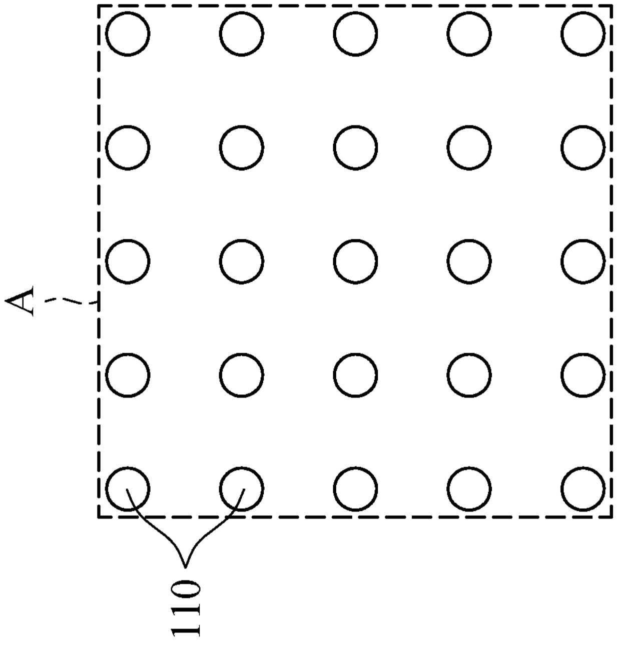
FIG. 14 is a schematic diagram of a region that the emitting portion irradiates on according to another embodiment of the invention.

Referring to FIG. 13 and FIG. 14, since the emitting portion 100 is the multiple point light source, when the light L from the emitting portion 100 passes through the optical member 300, it can irradiate the sensing object S by multiple light points 110 in a region A.

Figure 15:
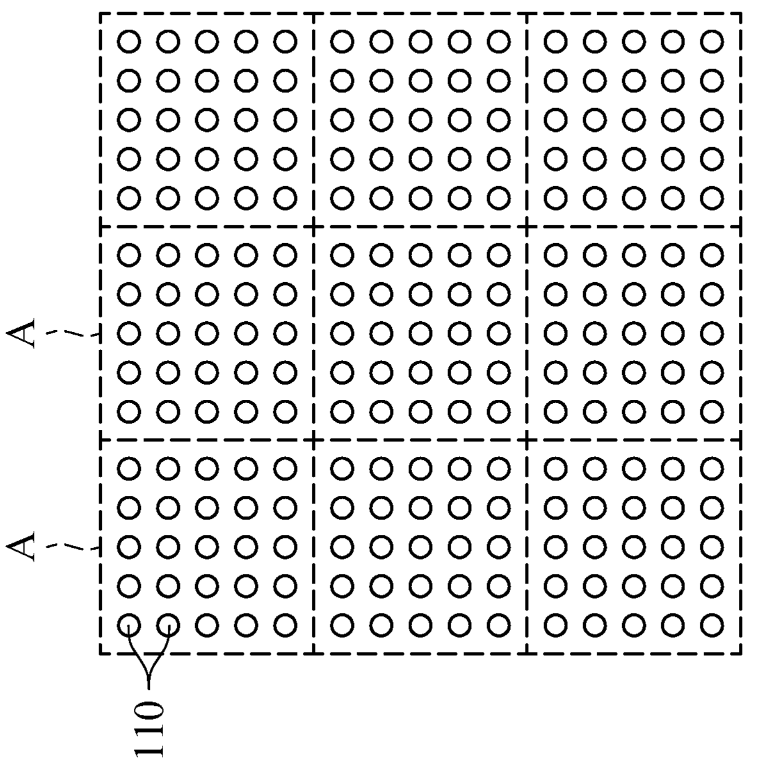
FIG. 15 is a schematic diagram of the regions that are scanned by the optical system according to another embodiment of the invention.

As shown in FIG. 15, since the emitting portion 100 and the optical member 300 can be driven to move when the driving assembly 900 drives the movable member 240 to move relative to the fixed member 230, the emitting portion 100 can scan a plurality of regions A of the sensing object S. In this embodiment, the optical system M scans at least nine regions A arranged in a 3×3 matrix. Since the light can be emitted to the plurality of regions A, and the optical member 300 with metamaterials can change the optical characteristic of the light to spread the light widely, the scanning area and the modeling area of the optical system can be increased.

Figure 16:
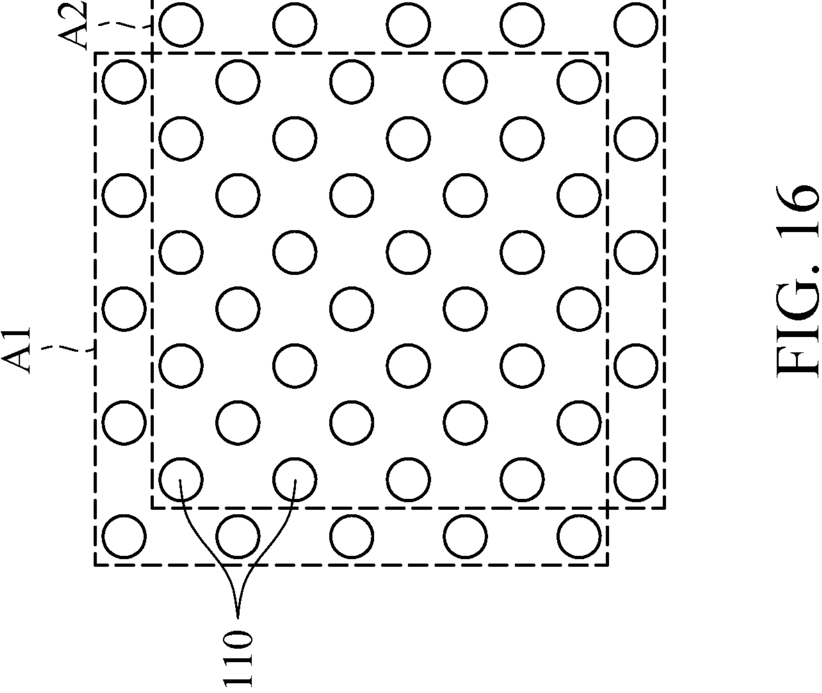
FIG. 16 is a schematic diagram representing that the scanning regions of the optical system overlap according to another embodiment of the invention.

Specifically, as shown in FIG. 16, the scanning regions A of the optical system M may overlap. For example, when the driving assembly 900 drives the optical member 300 to rotate to a first angle, the light L from the emitting portion 100 irradiates a first region A1 of the sensing object S, and when the driving assembly 900 drives the optical member 300 to rotate to a second angle that is different from the first angle, the light L from the emitting portion 100 irradiates a second region A2 of the sensing object S. The first region A1 and the second region A2 overlap. Therefore, the number of light points 110 in the overlapping area can be increased, and the resolutions and the precision of the scan can be enhanced.

Figure 17:
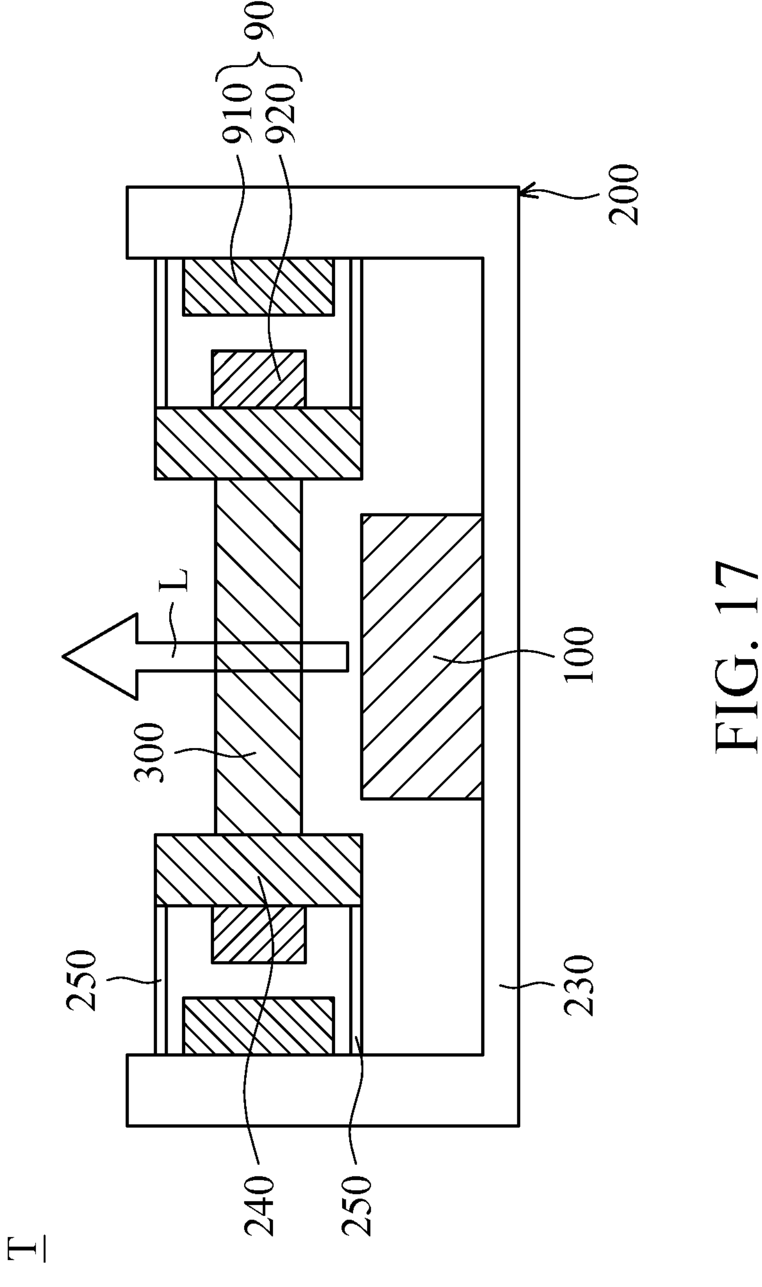
FIG. 17 is a schematic diagram of an emitter according to another embodiment of the invention.

Referring to FIG. 17, in another embodiment of the invention, the emitter T includes an emitting portion 100, a carrier portion 200, an optical member 300, and a driving assembly 900, wherein the structures and arrangements of the carrier portion 200, the optical member 300, and the driving assembly 900 are the same as those in FIG. 13, so that the features thereof are not repeated in the interest of brevity. The difference between the emitter T in this embodiment and the emitter T in FIG. 13 is in that the emitting portion 100 is disposed on the fixed member 230 of the carrier portion 200. Thus, the driving assembly 900 can drive the optical member 300 to move (shift or rotate) relative to the emitting portion 100.

Figure 18:
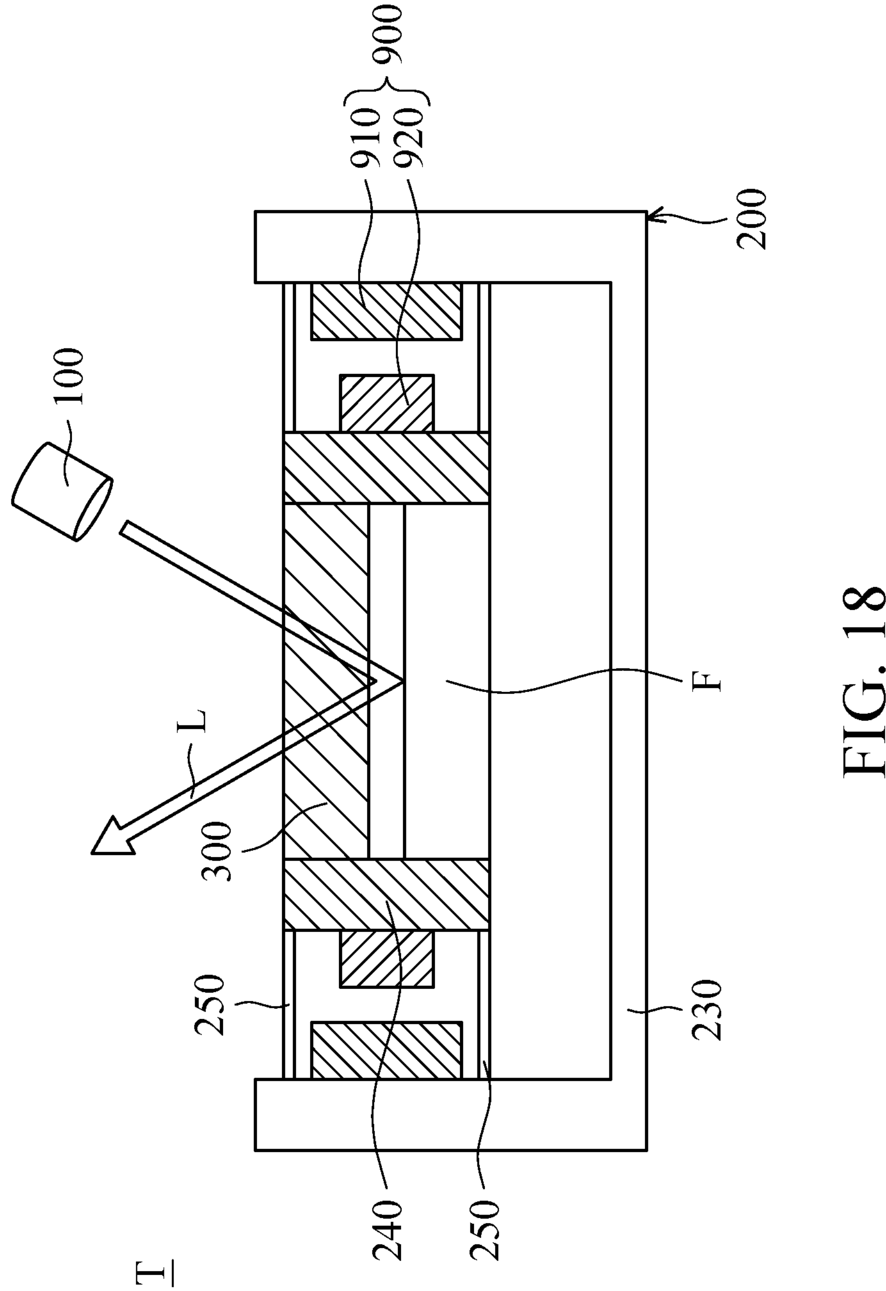
FIG. 18 is a schematic diagram of an emitter according to another embodiment of the invention.

Referring to FIG. 18, in another embodiment of the invention, the emitter T includes an emitting portion 100, a carrier portion 200, an optical member 300, a driving assembly 900, and a reflecting member F, wherein the structures and arrangements of the carrier portion 200, the optical member 300, and the driving assembly 900 are the same as those in FIG. 13, so that the features thereof are not repeated in the interest of brevity. The reflecting member F is affixed to the movable member 240, and the optical member 300 is disposed between the reflecting member F and the emitting portion 100. For example, the reflecting member F can be a mirror. The emitting portion 100 is a multiple point light source that can emit the light L toward the optical member 300. Therefore, the light L from the emitting portion 100 can pass through the optical member 300, be reflected by the reflecting member F, and pass through the optical member 300 again, finally reaching the sensing object S.

Figure 19:
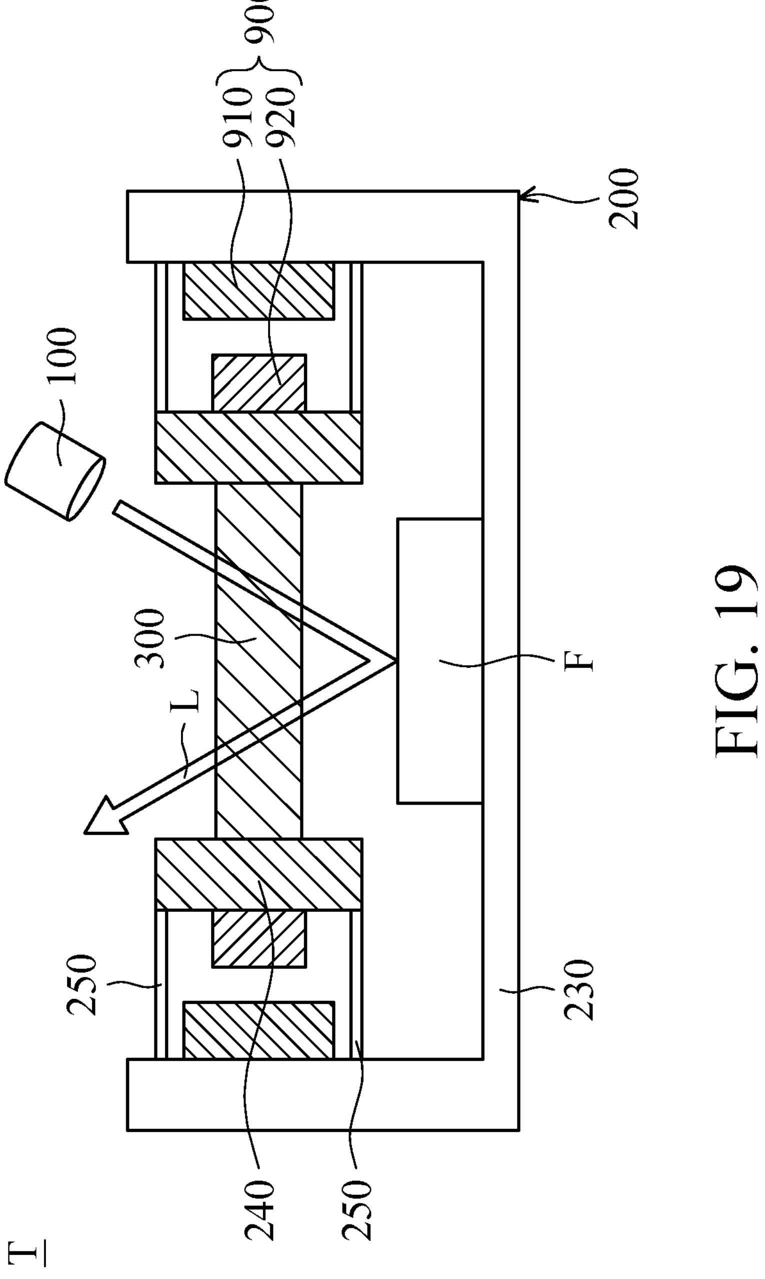
FIG. 19 is a schematic diagram of an emitter according to another embodiment of the invention.

Referring to FIG. 19, in another embodiment of the invention, the emitter T includes an emitting portion 100, a carrier portion 200, an optical member 300, a driving assembly 900, and a reflecting member F, wherein the structures and arrangements of the emitting portion 100, the carrier portion 200, the optical member 300, and the driving assembly 900 are the same as those in FIG. 18, so that the features thereof are not repeated in the interest of brevity. The difference between the emitter T in this embodiment and the emitter T in FIG. 18 is in that the reflecting member F is disposed on the fixed member 230 of the carrier portion 200. Thus, the driving assembly 900 can drive the optical member 300 to move (shift or rotate) relative to the reflecting member F.

In summary, an embodiment of the invention provides an optical system, including a carrier portion and an emitting portion. The carrier portion is configured to connect an optical member. The emitting portion is configured to emit a light, wherein the light is emitted toward a sensing object via the optical member.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system comprising:

a carrier portion, configured to connect to an optical member that comprises metamaterials; and an emitting portion, configured to emit a light, wherein the light is emitted towards a sensing object via the optical member, wherein the optical member comprises a plurality of optical regions and an intermediary region disposed between the optical regions, the light undergoes phase changes due to the optical regions, and a color of the intermediary region is deeper than a color of the optical regions.

2. The optical system as claimed in claim 1, wherein the optical regions have the same area.

3. The optical system as claimed in claim 1, wherein each of the optical regions has a longitudinal structure that is extended along a first direction, and the optical regions are arranged along a second direction, wherein the first direction is perpendicular to the second direction.

4. The optical system as claimed in claim 1, wherein the optical regions are arranged in a matrix.

5. The optical system as claimed in claim 1, wherein the optical member comprises a plurality of first microstructures and a plurality of second microstructures, the first microstructures are disposed in one of the optical regions, and the second microstructures are disposed in another of the optical regions, wherein the dimensions of each of the first microstructures are different from the dimensions of each of the second microstructures.

6. The optical system as claimed in claim 1, wherein the optical member comprises a plurality of first microstructures and a plurality of second microstructures, the first microstructures are disposed in one of the optical regions, and the second microstructures are disposed in another of the optical regions, wherein the size of the gap between the first microstructures is different from the size of the gap between the second microstructures.

7. The optical system as claimed in claim 1, wherein the optical member comprises a substrate and a plurality of microstructures, the microstructures are formed on a surface of the substrate, and each of the microstructures has a circular structure, an oval structure, a polygonal structure, or an irregularly shaped structure.

8. The optical system as claimed in claim 7, wherein the substrate comprises quartz or glass.

9. The optical system as claimed in claim 1, wherein the optical member is disposed between the emitting portion and the sensing object, and the optical member comprises a transparent material or a translucent material, wherein the light passes through the optical member and reaches the sensing object.

10. The optical system as claimed in claim 1, wherein the optical member comprises an opaque material, and the light is reflected by the optical member and then reaches the sensing object.

11. The optical system as claimed in claim 1, wherein the carrier portion comprises a base, and the optical system further comprises a first driving assembly configured to drive the optical member to move relative to the base.

12. The optical system as claimed in claim 11, wherein the carrier portion further comprises at least one suspension line connected to the base and the optical member, and the optical system further comprises a second driving assembly, wherein the first driving assembly is enabled to drive the optical member to rotate around a first rotation axis, the second driving assembly is enabled to drive the carrier to rotate around a second rotation axis, and the first rotation axis is substantially perpendicular to the second rotation axis.

13. The optical system as claimed in claim 1, wherein the optical system further comprises a reflecting member, and the light passes through the optical member and then is reflected to the sensing object by the reflecting member.

14. The optical system as claimed in claim 1, wherein the optical system further comprises a driving assembly connected to the emitting portion, and the driving assembly is configured to drive the emitting portion to rotate relative to the optical member.

15. The optical system as claimed in claim 1, wherein the optical system further comprises a reflecting member and a driving assembly, the emitting portion emits the light to the reflecting member, and the driving assembly drives the reflecting member to rotate relative to the optical member.

16. The optical system as claimed in claim 1, wherein the emitting portion comprises a multiple point light source, and the optical system further comprises a driving assembly configured to drive the carrier portion to move relative to the sensing object.

17. The optical system as claimed in claim 16, wherein the emitting portion is disposed on the carrier portion, and the optical member is disposed between the emitting portion and the sensing object, wherein the emitting portion and the optical member are fixed relative to each other.

18. The optical system as claimed in claim 16, wherein the optical member is disposed between the emitting portion and the sensing object, and the driving assembly is enabled to drive the carrier and the optical member to move relative to the emitting portion.

19. The optical system as claimed in claim 16, wherein the optical system further comprises a reflecting member, and the optical member is disposed between the emitting portion and the reflecting member, wherein the light passes through the optical member and then is reflected by the reflecting member, and the reflected light passes through the optical member again and reaches the sensing object.

20. The optical system as claimed in claim 19, wherein the reflecting member is disposed on the carrier portion, and the reflecting member and the optical member are fixed relative to each other.

21. The optical system as claimed in claim 19, wherein the driving assembly is enabled to drive the carrier and the optical member to move relative to the emitting portion.

22. The optical system as claimed in claim 16, wherein when the driving assembly drives the carrier portion and the optical member to move to a first angle, the light irradiates a first region of the sensing object, and when the driving assembly drives the carrier portion and the optical member to move to a second angle that is different from the first angle, the light irradiates a second region of the sensing object, wherein the first region and the second region overlap.

23. The optical system as claimed in claim 16, wherein the optical system further comprises a receiver, configured to receive the light reflected by the sensing object.

24. The optical system as claimed in claim 1, wherein an absorbance of the intermediary region is larger than an absorbance of the optical regions.

* * * * *